United States Patent Office 3,211,996
Patented Oct. 12, 1965

3,211,996
APPARATUS FOR DETECTING ELECTRONEGA-
TIVE GASES IN A MIXTURE OF GASES
Russell E. Fox, Forest Hills, and Arthur V. Phelps, Churchill, Pa., assignors to Westinghouse Electric Corporation, East Pittsburgh, Pa., a corporation of Pennsylvania
Filed Dec. 5, 1960, Ser. No. 73,876
8 Claims. (Cl. 324—33)

This invention relates generally to gas detecting and measuring methods and apparatus, and relates particularly to the detection and measurement of electronegative gases in the atmosphere.

Heretofore, electronegative gases have been used and more and more extensively as gaseous dielectrics in high voltage devices, and as arc quenching media in circuit interrupters. Of these gases, sulfur hexafluoride, $SF_6$, has probably found the most wide spread usage. In the above applications of this gas, it is usually sealed in the device at pressures exceeding atmospheric. From these applications there has arisen a need for a leak detector which is sensitive to $SF_6$. This invention relates to such an instrument which is capable of measuring very small traces of such gas in the ratios of about one part in $10^7$ by volume of $SF_6$ in air.

The following discussion will be directed primarily to the performance of the detector with respect to $SF_6$. However, it is to be understood that the apparatus is capable of detecting any of the electronegative gases, such as, selenium hexafluoride $SeF_6$, or trifluoromethyl sulfur pentafluoride $CF_3SF_5$.

It is also to be understood that the leak detector of this invention may be used for detecting electronegative gases generally and thus has wide application in many fields of endeavor. For example, the detector may be used for detecting any one of a group of halogenated hydrocarbons containing one or more chlorine atoms and which are widely used as refrigerants and propellants, for example, such as dichlorodifluoromethane ($CCl_2F_2$).

The operation of the electronegative gas detector and the methods it employs are based on the differences among various electronegative gases in the rates of electron attachment at low electron energies to form negative ions, and on the differences of mobilities of the various negative ions in an electric field. For a detailed discussion of the phenomenon of electron attachment by electronegative gases, reference is made to a paper by W. M. Hickam and R. E. Fox in the Journal of Chemical Physics, 1956, vol. 25, page 642 and to a paper by W. M. Hickam and D. Berg in the Journal of Chemical Physics, 1958, vol. 29, No. 3, page 517.

Accordingly, it is an object of this invention to provide apparatus to detect and measure very small concentrations of electro-negative gases in the atmosphere by observing the changes of phase in current in an electrical system between two electrodes, which current is affected by the mobility of the ions of the test electronegative gas and its affinity for electrons.

More specifically, it is an object of this invention to provide apparatus to detect and measure very small concentrations of electro-negative gases in the atmosphere or in a mixture of gases by producing pulses of electrons at a cathode, which electrons are attached to the electronegative gas to form ions, and by measuring the cathode to anode transit time of the ions which results in different phase shifts of the observed cathode current to thereby provide an indication of the concentration of an electronegative gas in the atmosphere.

Generally stated, the gas detector of this invention employs this ability of electronegative gases in an apparatus to capture electrons and essentially measures the mobility of these negative ions so produced to provide an indication of the concentration of an electronegative gas in a gas mixture. The gas detector comprises a suitable source, such as a mercury lamp for emitting radiation which shines onto a photosensitive cathode. Photoelectrons emitted from the cathode are attached by the gas in this region. Under the influence of an electric field applied between the cathode and anode the negative ions move toward the anode. A wave form generator leading into a modular circuit serves to modulate the intensity of radiation from the source. If desired, other types of emitters, such as the cold cathode type, may be modulated to provide electrons in lieu of the photocathode type of emitter. Thus, the density of electrons and hence the number of negative ions which move across the gap between the cathode and anode vary in time. An amplifier detects this current and feeds it into a phase sensitive detector. The wave form generator also feeds into the phase sensitive detector. A phase shifting circuit is provided for adjustment so that when normal air is flowing through the system the phase difference is zero to disregard the phase shift caused by the formation of oxygen ions $O_2^-$ in the atmosphere. If $SF_6$ is now introduced into the gap, negative ions of $SF_6$ are formed. Since $SF_6$ has a much larger attachment coefficient than oxygen for low energy electron, and since $SF_6$ is a much heavier gas, the average negative ion current reaching the collector or anode will be shifted in phase, which phase shift is detected by the phase sensitive detector and passed on to an indicator such as a meter. Air from the area to be sampled is drawn in through a probe by a pump and is passed through a dust filter and a humidity controller and passed on to the area of the anode and cathode.

For a more detailed description of the apparatus, and its method of operation, reference is made to the drawings illustrating one of various possible embodiments of the invention, and wherein.

Figure 1:
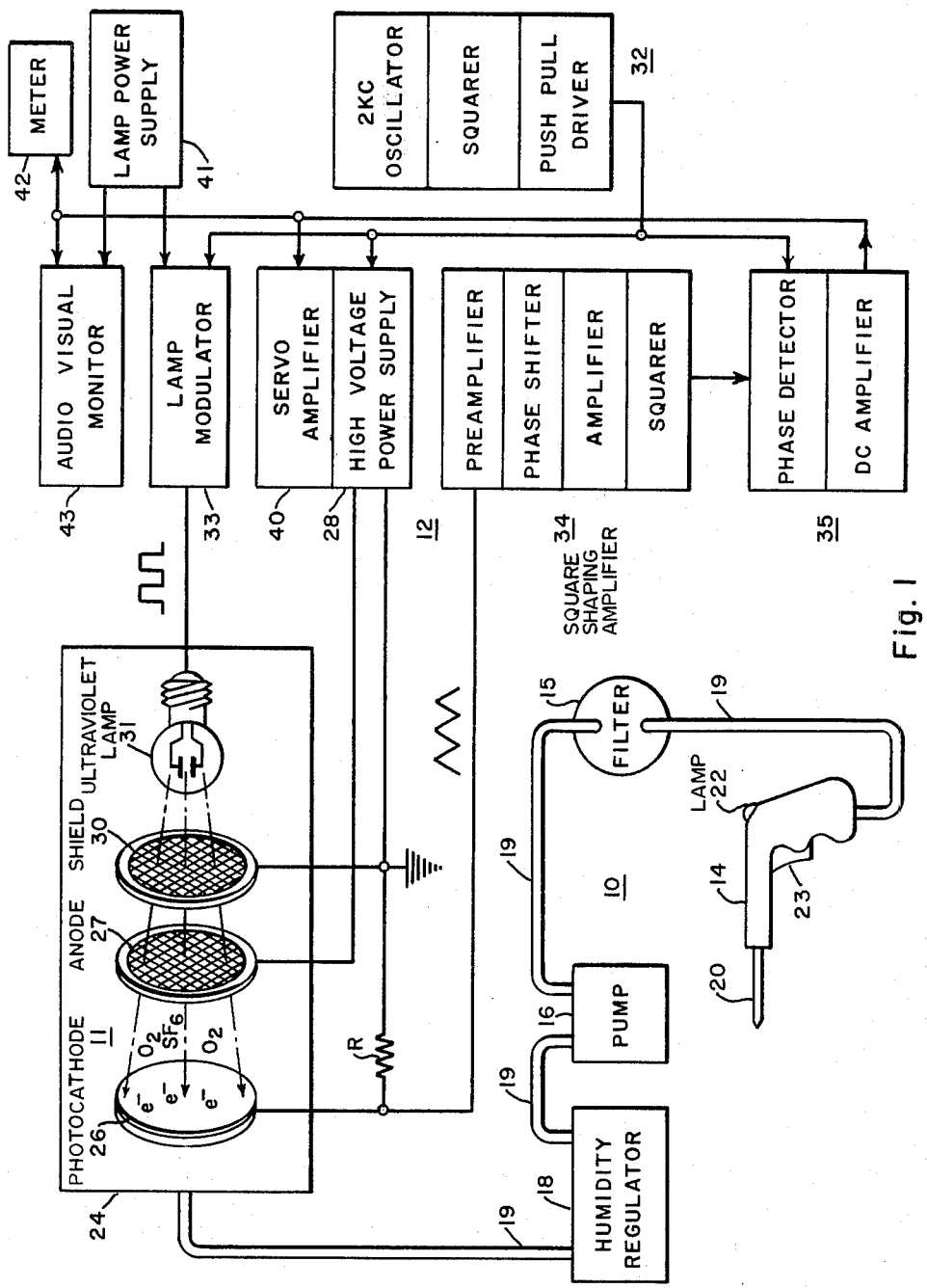
FIGURE 1 is a diagrammatic view of the gas detector system.

Referring now to the drawings, and particularly to FIG. 1, it is seen that the appartus comprises an atmosphere sampling and conditioning system generally indicated at 10, a gas detector head generally indicated at 11 and adapted for receiving the gas samples provided by the sampling system 10, and an electrical system generally indicated at 12 and electrically associated with the head 11 for measuring and indicating the quantity of test gas in the air samples.

The air sampling system 10 comprises a pistol-shaped probe 14, a filter 15, a pump 16 and a humidity regulator 18, all series connected by means of hose portions 19, one of which hose portions connects the sampling system 10 to the head 11.

The probe 14 includes a nozzle 20 for gaining access to remote locations around various apparatus and for localizing the area from which air samples are taken, such as near the joints of tanks containing $SF_6$. A lamp 22 is positioned on the probe 14 to facilitate visual indication of measurements in a manner to be hereinafter described. A two position trigger 23 is provided on the probe 14 for switching the pump to the on or off condition when the trigger is pulled and released, respectively. Suitable electrical connections (not shown) may run contiguous with the hose portions 19 to connect the trigger switch 23 to suitable equipment as hereinafter described.

The filter 15 removes dust particles from the in rushing air and may be of any conventional type.

The pump 16 operates to pull the air through the probe 14 and may be of any conventional type which will deliver a smooth air flow.

The humidity regulator 18 may be of conventional structure and comprises a refrigerated condenser. The humidity regulator is included in the sampling system for the purpose of extracting water from the air sample flowing through it, and for bringing the sample into predetermined thermal equilibrium with water to thus stabilize the humidity of the air to a predetermined dew point.

The humidity regulator is found to be advantageous for the purpose of eliminating the adverse effects of water vapor on the ultimate stability of the instrument. The role of water vapor is not completely understood. Although it is well known that negative ions of water vapor can be formed under certain conditions, it is not believed that this is the effect which takes place in this instrument. It is believed that water vapor molecules cluster about the negative ions and further increase the transit time of the ions across the gap. Therefore, additions of water vapor or polar or polarizable gases, such as ammonia ($NH_3$) to the gas sample give a phase shift similar to that observed for $SF_6$, only with a reduced sensitivity. If desired, the humidity regulator may be omitted if the moisture content of the air samples is not high enough to cause a significant background reading.

It is to be noted from the foregoing that although the prime purpose of the apparatus is to detect electronegative gas, this principle may be utilized to detect the presence of polar or polarizable gases as well.

The gas detecting head element 11 comprises a chamber 24 connected to the output of the humidity regulator 18 of the sampling system 10 to receive the air sample, and includes therein a photocathode 26 separated by a predetermined small distance, such as 0.25 centimeters, from a wire mesh anode 27. The anode 27 is operated at a positive voltage with respect to the substantially grounded cathode 26 by means of an interconnected source 28 located in the electrical system 12. A cathode load resistor R detects current changes in the anode cathode circuit. A second grounded wire mesh 30 serves as an electrostatic shield. An ultraviolet source 31 provides photons of predetermined sufficient intensity to impinge upon the photocathode surface 26 to liberate a photoelectron current on the order of about $10^{-8}$ amperes. The photocathode may be comprised of conventional photo-emissive materials; however, investigations with a number of cathode materials indicate that silver sulfide is the most satisfactory material from the standpoint of both photoelectric efficiency and stability.

The electric circuitry 12 for measuring and indicating the quantity of test gas in the air sample comprises a square wave generator 32 which may include an oscillator, a squarer and a driver. The generator 32 drives a lamp modulator circuit 33 for modulating the intensity of the ultraviolet lamp 31. This produces photoelectrons at the photocathode 26 which combine with the test gas $SF_6$ to form pulses of ions which move across the gap between cathode 26 and anode 27. An alternating current amplifier 34, which may include a preamplifier, a phase shifter, an amplifier and a shaper or squarer, is connected to the cathode 26 to detect the ion current and feed it into a phase sensitive detector 35. The square wave generator 32 also feeds into the phase sensitive detector 35 to provide the reference pulses.

As previously mentioned, the instrument is sensitive to electronegative gas generally, including oxygen, and, inasmuch as oxygen is present to a significant degree in air, the instrument should be adjustable so that the oxygen in the ambient air sample passing through the head 11 provides a zero output from the phase detector. This is accomplished with a stable phase shifter included in the amplifier unit 34, which shifter is adjustable and serves as a coarse phase adjustment. Fine phase adjustment is made by servo system 40 which controls the voltage of system 28 applied across the gap, hence controlling the ion velocities. The servo system 40 continually adjusts the voltage to produce zero output from the phase differential detector 35 except when the hereinbefore described probe mounted trigger switch 23 is pulled or actuated. As soon as the trigger 23 is pulled, the servo unit is deenergized, and the instrument then indicates any further phase shifts produced by changes in concentration of negative ion producing components present in the air. Thus, in normal operation, the detector accommodates itself to the ambient atmosphere and only measures changes in the concentration of these components.

In order to determine the absolute amount of a particular electronegative gas in ambient gas, it is necessary to have for comparison purpose a sample which does not contain this particular electronegative gas. The procedure then is to zero the instrument with the ambient gas and then sample the gas to be tested.

A meter 42 is provided to indicate the concentration of $SF_6$ in response to the output from the phase differential detector 35. In addition, if desired, the flashing lamp 22 on the probe handle and a pulsed audio tone device 43 monitors the reading from the phase detector so that it is unnecessary to watch the meter while searching for leaks.

In the operation of the hereinbefore described leak detector apparatus, the ultraviolet lamp 31 is modulated at about 2000 cycles per second by means of the square wave current applied to the lamp electrodes. In the absence of any molecules capable of forming negative ions, the current to the head anode 27 due to photoelectrons is a 2000 cycle per second square wave inasmuch as the transit time of the electrons is less than a microsecond. If there are molecules present which can capture electrons to form negative ions, then the current to the anode will be delayed in time depending upon where in the cathode-anode gap the attachment takes place, and upon the mobility of the negative ion. The ions move much slower than the electrons, hence the charges reach the anode at a later time, having traveled at a lower velocity. The current induced in the load resistor R is the sum of all charges moving in the gap multiplied by their velocities.

In one practical embodiment of this instrument, the gas normally in the gap is air at atmospheric pressure and the voltage applied between the cathode and anode 27 is about 200 volts, providing a field gradient (E) of 800 volts per centimeter and an $E/p$ (field gradient per unit of pressure) of about 1 volt/cm.-mm. Hg. Under these conditions, the electrons released from the cathode quickly become thermalized with an average energy of only a few thousandths of an electron volt. It has been shown in the hereinbefore mentioned technical papers that $SF_6$ has a very high capture cross section for electrons at this low energy. Unfortunately as has been previously indicated, oxygen has a fairly large electron attachment rate by way of a three body collision process which results in the formation of oxygen ions. It becomes necessary, therefore, to distinguish between oxygen negative ions and $SF_6$ negative ions. Hereafter, the symbol $SF_6$ will refer to all negative ions formed by the molecule $SF_6$, since several negative ions, suc has $SF_6^-$, $SF_5^-$ and $F^-$ are formed at low energies.

Figure 2:
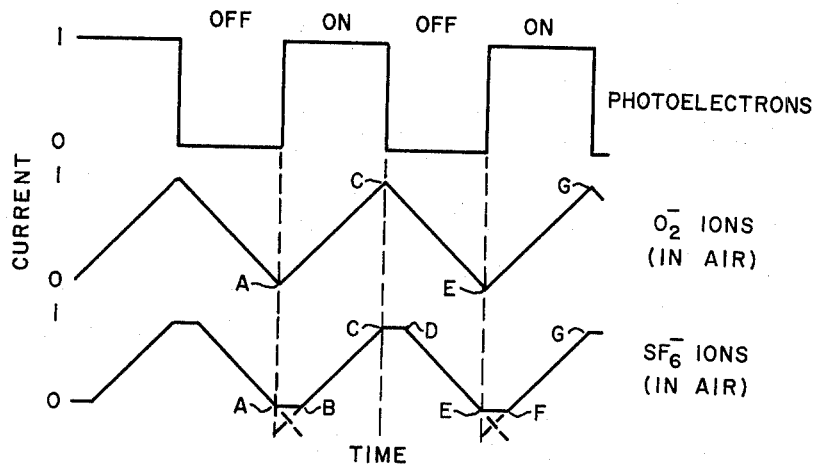
FIG. 2 is a group of curves indicating the relative difference in ion currents in the gas detector system depending upon the nature of the test gas.

The manner in which this distinction between $SF_6$ ions and oxygen ions is accomplished may be seen by reference to FIG. 2.

In the top line of FIG. 2 is the square wave current produced in the external circuit by the photoelectron current in the absence of an attaching gas. The off-on regions designate the interval during which the ultraviolet lamp or photon source 31 is off or on. On this time scale the electrons appear to reach the collector or anode 27 almost as soon as the light is turned on. Thus, the electron current wave shape shown in the top line of FIG. 2 is essentially identical with the light production.

In the second line of FIG. 2 is shown the wave shape produced when normal dry air is in the gap. This diagram assumes that the attachment of electrons to form oxygen ions occurs in a distance which is small compared to the gap distance. This assumption is made to simplify the explanation of the operating principles. When the lamp 31 is turned on at A, oxygen ions are created and begin to move across the gap. During the interval A to C the number of ions in the gap is increasing at a constant rate and therefore one sees a linear increase in the current to point C. At point C, when the first oxygen ions reach the anode, the light is turned off. The turn off time is established by choosing the proper frequency and applied voltage. At this point, since the lamp is off, the production of ions ceases. The gap is now filled uniformly with negative ions. These ions moving at a constant velocity will be collected at a constant rate, hence, there will be a linear decrease in the observed current until time E, when the lamp 31 is turned on and the process repeated. Thus, the measured current wave shape is triangular as shown, and has effectively a 90° phase lag referred to the modulating wave form. Since the triangular wave shape lags the modulating wave 90°, the current for oxygen results in zero output at the phase detector.

It is now assumed that enough $SF_6$ is added to the sample so that essentially all of the charges moving across the gap are $SF_6$ ions. Experiments show that because of the much larger attachment cross sections for $SF_6$ than $O_2$ this condition exists when the $SF_6$ concentration reaches 0.1%. The observed current is then as shown in the bottom line of FIG. 2. At point A, the lamp has just been turned on, but due to the slower mobility of the $SF_6$ ions, there are still some ions left in the gap from the previous pulse. During the time interval A to B these ions are collected at the same rate as ions in the new pulse. Therefore, the sum of all ions in the gap, and hence the current in R, is constant during this interval. At point B, all the ions from the previous pulse have been collected, but the new ions being produced at a constant rate give a linear rise in current to point C. At C, the lamp is turned off, but since the transit time of the ions is greater than half the period of the square wave, the first ions produced in this pulse have not yet reached the anode; therefore, for the time interval from C to D the number of charges moving in the gap is again constant. At D, the first ions reach the anode and begin to be collected, hence the current decreases at a constant rate to E when the lamp 31 is turned on again and the cycle is repeated. The observed wave shape is now trapezoidal, and has an additional phase lag, as compared with that of $O_2^-$ above, so that the output of the phase detector is no longer zero and a positive indication is displayed on the meter.

As the concentration of $SF_6$ is decreased, the current is comprised of both $O_2^-$ and $SF_6^-$ ions, the wave shape is some combination of these two conditions. Depending on the concentration of $SF_6$, the alternating current components of these currents are amplified and shaped in the high gain saturating amplifier 34 (FIG. 1), then fed into the phase detector 35 (FIG. 1). The direct current output of the phase detector is amplified by a direct current amplifier in the phase detector system 35 and displayed on a meter 42 or other indicating device such as a pen and ink recorder, not shown. The square-shaping amplifier 34, together with the signal level regulating circuit 40, make it possible to operate the detector so that its output is insensitive to changes in the amplitude of the current, such as may be caused for instance by aging of the photosurface, but depends only on the phase shift corresponding to the transit time of the charges. The phase differential detector 35 gives zero output for a 90° phase shift or differential, as hereinbefore mentioned, so that its output voltage is proportional to the additional phase shift, due to the $SF_6$ concentration.

Figure 3:
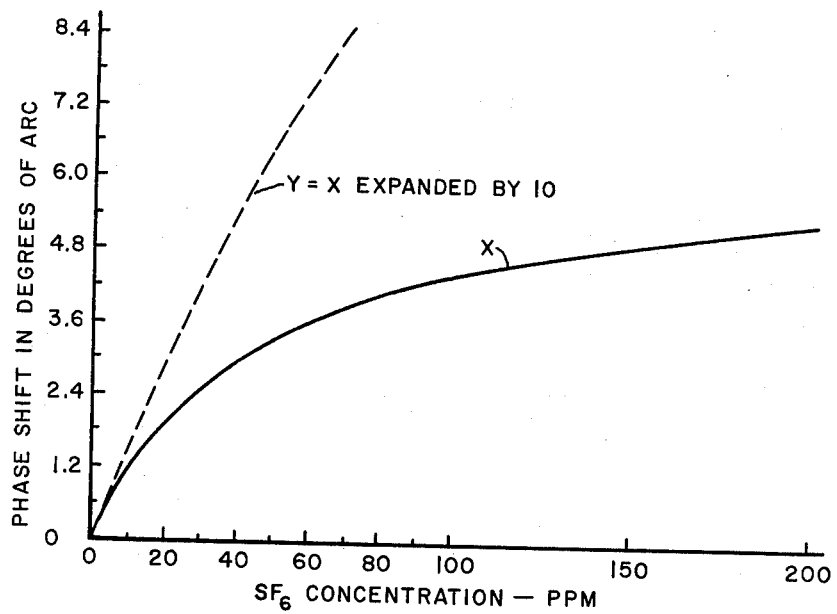
FIG. 3 is a plot of a curve showing the phase shift in the gas detector electrical system as a function of sulfur hexafluoride concentration in air.

FIG. 3 shows the calibration of the instrument for $SF_6$, where phase shift is plotted as a function of $SF_6$ concentration in air, given in parts per million.

Increased sensitivity may be obtained by replacing the air with an inert gas such as dry nitrogen, or any of the gases which do not form negative ions. When $SF_6$ is added to these gases the measured transit time is between that for $SF_6^-$ ions and electrons, which is considerably larger than that between $SF_6^-$ and $O_2^-$.

Although the present invention is disclosed as used to detect $SF_6$ in circuit interrupting devices, it will be readily understood by those skilled in the art, that it may be used for detecting the presence of electronegative gas wherever it may be found without departing from the spirit and scope of the invention.

Furthermore, it will be apparent to those skilled in the art that the spirit and scope of the invention may be incorporated in various embodiments, and therefore the claims are not intended to be limited to the specific embodiment disclosed herein.

We claim as our invention:

1. Apparatus for detecting electronegative gases in a gas mixture, comprising: a pair of spaced electrodes disposed in said mixture; means for producing pulses of free electrons at one of said electrodes; means connecting said electrodes in electric circuit to provide a voltage differential between the electrodes to effect transit of said electrons across the space between said electrodes to the other of said electrodes at predetermined energy suitable for attachment of said electrons to the electronegative gas in said mixture to form negative ions of said electronegative gas; phase differential detecting means for detecting difference in phase between the production of electron pulses at said one of said electrodes and the reception of ion pulses at the other of said electrodes, and adjustable phase shifting means cooperating with the detecting means to distinguish between two electronegative gases in the gas mixture.

2. Apparatus for detecting electronegative gas in a mixture of gases, comprising: a photocathode; an anode spaced from said photocathode; means providing samples of said mixture between the photocathode and the anode; means providing a voltage differential between said photocathode and said anode; radiation source means for transmitting photons to said photocathode to effect emission of electrons from said photcathode; pulsing circuit means connected to pulsate the intensity of said radiation source; means for detecting current between said anode and said photocathode; phase differential detecting means responsive to said pulsing circuit means and said current detecting means to indicate the concentration of electronegative gas in said gas mixture in accordance with the phase differential.

3. Apparatus for detecting electronegative gas in a mixture of gases, comprising: a pair of spaced electrodes in said gas mixture; one of said electrodes comprising a photosensitive cathode; the other of said electrodes comprising an anode; a radiation source for transmitting photons to said cathode to effect emission of electrons for attachment to the electronegative gas to form negative ions; circuit means providing an electric field between said electrodes to effect transmission of said ions across the space to said anode; means including a wave form generator for modulating the intensity of the radiation source; means for detecting the current between the electrodes and including means for shaping the current similarly to the wave form of the wave form generator; phase differential detector means responsive to said detecting means and said wave form generator for providing an output proportional to the phase difference to thus provide an indication of concentration of electronegative gas in the gas mixture.

4. Apparatus for detecting electronegative gases in a mixture of said gases with air, comprising: a pair of spaced electrodes in said mixture of said gases with air; means for producing pulses of electrons at one of said electrodes; means connecting said electrodes in electric circuit relationship to effect transit of said electrons from said one electrode across the space to the other electrode at predetermined energies suitable for attachment of said electrons to the electronegative gas to form negative ions of said electronegative gas; means for detecting differences in phase between the production of electron pulses at said one electrode and the reception of ion pulses at said other electrode; and phase shifting means adjustable to nullify any phase difference initially provided by air alone.

5. Apparatus for detecting electronegative gas in a mixture of said gas with air, comprising: a chamber; a pair of spaced electrodes disposed in said chamber; means for inserting samples of said mixture into said chamber; means for providing an electric field between said electrodes in said chamber; means for providing pulses of free electrons in said field; phase sensitive means for detecting changes in the mobility of said electrons in said field between said electrodes caused by the attachment of the electrons to said electronegative gas to form negative ions, and phase shifting means compensating for the effect of air alone on the phase sensitive means, said phase sensitive means being responsive to the difference in phase between said pulses of electrons and the ions received at one of said electrodes.

6. Apparatus for detecting electronegative gas in a mixture of said gas with air, comprising: a chamber; a pair of spaced electrodes disposed in said chamber; means for inserting samples of said mixture into said chamber; means providing an electric field between said electrodes in said chamber; means for providing pulses of electrons in said field; phase sensitive means for detecting changes in the mobility of said electrons in said field caused by the attachment of the electrons to said electronegative gas to form negative ions; said sample inserting means including means for removing moisture from said samples prior to insertion into said chamber, and phase shifting means compensating for the effect of air alone on the phase sensitive means, said phase sensitive means being responsive to the difference in phase between said pulses of electrons and the ions received at one of said electrodes.

7. Apparatus for detecting particular electronegative gas in a mixture of gases, comprising: a pair of spaced electrodes; means for providing an electric field between said electrodes in gas samples; means for providing pulses of free electrons in said field; phase sensitive means for indicating the concentration of electronegative gas in said sample in accordance with the changes in mobility of said electrons in said field between said electrodes caused by attachment of said electrons to electronegative gas in said gas samples to form negative ions; and phase shifting means for zeroing the indicator means on a gas sample, and phase shifting means compensating for the effect of air alone on the phase sensitive means, said phase sensitive means being responsive to the difference in phase between said pulses of electrons and the ions received at one of said electrodes.

8. Apparatus for detecting electronegative gas in a mixture of gases, comprising a pair of spaced electrodes in said mixture of gases, means for producing pulses of electrons adjacent to one of said electrodes, means for providing an electric field between said electrodes to effect transmission of said electrons from said one electrode to the other electrode at predetermined energies for attachment to the electronegative gas to form negative ions, means responsive to the means for producing pulses of electrons and the ions received at the other electrode for providing an output which varies with the phase difference between said pulses of electrons and said ions received at the other electrode to provide an indication of the concentration of electronegative gas in the mixture of gases.

References Cited by the Examiner

UNITED STATES PATENTS

| | | | |
|---|---|---|---|
| 2,820,946 | 1/58 | Robinson | 324—33 |
| 2,932,966 | 4/60 | Grindell | 324—71 X |
| 2,950,387 | 8/60 | Brubaker | 324—33 |
| 3,043,956 | 7/62 | Cohen | 250—43.5 X |

FOREIGN PATENTS 1,211,811  10/59  France.

WALTER L. CARLSON, *Primary Examiner.*

LLOYD McCOLLUM, FREDERICK M. STRADER,
*Examiners.*